US010663365B2

United States Patent
Subasinghe et al.

(10) Patent No.: US 10,663,365 B2
(45) Date of Patent: May 26, 2020

(54) METHOD FOR MEASURING MOTOR BRAKE HEALTH

(71) Applicant: Rockwell Automation Technologies, Inc., Mayfield Heights, OH (US)

(72) Inventors: Maddumage P. Subasinghe, Hopkins, MN (US); Joseph M. Sands, Minneapolis, MN (US); Kanagala S. Rao, Eden Prairie, MN (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 112 days.

(21) Appl. No.: 15/717,117

(22) Filed: Sep. 27, 2017

(65) Prior Publication Data
US 2019/0094091 A1 Mar. 28, 2019

(51) Int. Cl.
*G01L 5/28* (2006.01)
*H02P 1/16* (2006.01)
*H02P 3/04* (2006.01)
*F16D 66/00* (2006.01)

(52) U.S. Cl.
CPC ............... *G01L 5/28* (2013.01); *H02P 1/166* (2013.01); *H02P 3/04* (2013.01); *F16D 2066/006* (2013.01)

(58) Field of Classification Search
CPC ... G01L 5/28; H02P 1/166; H02P 3/04; F16D 2066/006
USPC .......................................................... 73/121
See application file for complete search history.

(56) References Cited

U.S. PATENT DOCUMENTS

| | | | | |
|---|---|---|---|---|
| 3,844,385 | A | * | 10/1974 | Szekely ................. B60T 1/067 188/70 B |
| 5,785,158 | A | * | 7/1998 | Grimm ................... F16D 55/28 188/134 |
| 6,202,804 | B1 | | 3/2001 | Dropmann et al. |
| 6,802,402 | B2 | | 10/2004 | Bausch et al. |
| 8,782,877 | B2 | | 7/2014 | Gebhart |
| 2001/0013731 | A1 | * | 8/2001 | Shinohara ............... B60K 6/26 310/85 |
| 2004/0124046 | A1 | * | 7/2004 | Hayes ................. F16D 65/0006 188/218 XL |
| 2005/0156545 | A1 | * | 7/2005 | Mueller ............... G05B 19/291 318/273 |

(Continued)

FOREIGN PATENT DOCUMENTS

| | | |
|---|---|---|
| CN | 104 329 221 B | 2/2017 |
| EP | 3 023 846 A1 | 5/2016 |
| WO | WO 2017/089652 | 6/2017 |

OTHER PUBLICATIONS

European Search Report dated Jan. 25, 2019 in connection with European Application No. 18197160.7.

(Continued)

*Primary Examiner* — Natalie Huls
*Assistant Examiner* — Monica S Young
(74) *Attorney, Agent, or Firm* — Fay Sharpe LLP (57) ABSTRACT

A motor assembly and method for measuring brake backlash using onboard components of the motor assembly. The method includes engaging a brake of the motor assembly, applying torque to an output shaft of the motor assembly in first and second rotational directions and measuring a difference in angular position of the output shaft using a position feedback device of the motor to calculate brake backlash.

14 Claims, 7 Drawing Sheets

(56) References Cited

U.S. PATENT DOCUMENTS

| | | | | |
|---|---|---|---|---|
| 2005/0217952 | A1* | 10/2005 | Usui | ........................ F16D 65/18 |
| | | | | 188/265 |
| 2005/0241894 | A1* | 11/2005 | Baumgartner | ........ F16D 65/567 |
| | | | | 188/79.51 |
| 2006/0293818 | A1* | 12/2006 | Lu | ...................... B62D 15/0235 |
| | | | | 701/41 |
| 2009/0251016 | A1* | 10/2009 | Zisler | ..................... H02K 7/102 |
| | | | | 310/77 |
| 2015/0192181 | A1* | 7/2015 | Asen | .................. F16D 55/2255 |
| | | | | 188/71.8 |
| 2017/0222577 | A1* | 8/2017 | Anderson | ............... H02P 23/06 |
| 2018/0354757 | A1* | 12/2018 | Jantunen | ................ B66C 13/23 |
| 2019/0063524 | A1* | 2/2019 | Booher | ................. F16D 65/123 |

OTHER PUBLICATIONS

Communication regarding Third Party Observation filed on Sep. 13, 2019 in connection with EP20180197160 (2 pages).

\* cited by examiner

METHOD FOR MEASURING MOTOR BRAKE HEALTH

BACKGROUND INFORMATION

Rotary servo motors are widely known and used to provide rotary motion control for industrial machinery and other applications. A rotor rotates relative to a stator in response to control input commands from a motor drive. An output shaft of the servo motor is operably connected to the rotor to rotate therewith. The output shaft projects outwardly from or is otherwise accessible at the motor housing at a front end. An encoder is operatively associated with the output shaft of the motor at an opposite rear end of the motor housing and provides feedback to the motor drive as to the angular position of the output shaft and rotor such that rotation of the output shaft is further controlled in response to the feedback to obtain a precise desired angular position for the rotor and output shaft connected thereto. Servo motors often further include a holding brake assembly or parking brake assembly that is selectively applied after the rotor is stopped in the desired angular position to hold the output shaft and rotor in such desired angular position.

Over time, operation of the rotary servo motor results in wear on one or more of the brake assembly components. Routine maintenance and servicing can generally counteract the effects of wear and tear. However, identifying the root cause of maintenance issues (e.g., performing manual diagnostics) may be difficult and time-consuming, and precautionary replacement or repair of components on a set schedule can be inefficient.

BRIEF DESCRIPTION

Aspects of the present disclosure are directed to monitoring brake backlash using a position feedback device of an electric motor. By periodically performing a self-diagnostic routine using onboard components in accordance with the present disclosure, brake wear can be monitored such that replacement of certain components can be performed prior to brake failure.

In accordance with one aspect, a method for measuring motor brake health of a motor assembly having a brake assembly for braking an output shaft of the motor and a position feedback device for measuring an angular position of the output shaft is set forth. The method comprises engaging the brake assembly to restrict rotation of a brake rotor of the brake assembly, energizing the motor assembly to apply a backlash measuring torque level to the output shaft of the motor assembly in a first direction while the brake assembly is engaged, measuring a first angular position of the output shaft with the position feedback device while the backlash measuring torque level is being applied, energizing the motor assembly to apply a backlash measuring torque level to the output shaft in a second direction while the brake assembly is engaged, and measuring a second angular position of the output shaft with the position feedback device while the backlash measuring torque level is being applied. The difference between the first angular position and the second angular position corresponds to an amount of backlash between the brake rotor and a brake hub of the brake assembly.

Engaging the brake can be performed by an onboard motor controller of the motor assembly. Energizing the motor assembly to apply a backlash measuring torque level to the output shaft in the first or second direction can also be performed by the onboard motor controller while the brake is engaged. The method can further include centering the brake rotor prior to energizing the motor assembly. Centering the brake rotor can include energizing the motor assembly to apply a centering torque level to the output shaft in a first rotational direction and energizing the motor assembly to apply a centering torque level to the output shaft in a second rotation direction. The centering torque level can be greater than the backlash measuring torque level.

In accordance with another aspect, a motor assembly comprises an electric motor, a position feedback device and a brake assembly. The electric motor includes a stator, a rotor and an output shaft configured to be driven by the rotor. The brake assembly is operatively coupled to the output shaft for braking rotation of the output shaft, the brake assembly includes a brake hub fixed to the output shaft for rotation therewith and a brake rotor rotationally coupled to the brake hub. The position feedback device is configured to measure an angular position of the output shaft. A motor controller is operatively coupled to the electric motor and the brake assembly and includes a brake diagnostic module configured to engage the brake assembly to restrict rotation of the brake rotor, energize the electric motor to apply a backlash measuring torque level to the output shaft of the motor assembly in a first direction while the brake assembly is engaged, measure a first angular position of the output shaft with the position feedback device while the backlash measuring torque level is being applied, energize the motor assembly to apply a backlash measuring torque level to the output shaft in a second direction while the brake assembly is engaged, and measure a second angular position of the output shaft with the position feedback device while the backlash measuring torque level is being applied. The difference between the first angular position and the second angular position corresponds to an amount of backlash between the brake rotor and a brake hub of the brake assembly.

The electric motor can be a servo motor. The brake assembly can include a coil and at least one spring for biasing an armature of the coil toward a brake engaged position, the coil being configured to disengage the brake when energized by the onboard controller. The brake rotor and brake hub can have mating splines, the brake rotor being movable axially relative to the brake rotor during brake engagement and disengagement. The splines can be trapezoidal in cross-section. The onboard controller can be further configured to center the brake rotor prior to energizing the motor. Centering the brake rotor can include energizing the motor to apply a centering torque level to the output shaft in a first rotational direction and energizing the motor to apply a centering torque level to the output shaft in a second rotation direction. The centering torque level can be greater than the backlash measuring torque level.

In accordance with another aspect, a motor controller is set forth for a motor assembly having an electric motor with an output shaft, a brake assembly for braking rotation of the output shaft, and a position feedback device. The motor controller comprises a brake diagnostic module configured to engage the brake assembly to restrict rotation of a brake rotor of the brake assembly, energize the electric motor to apply a backlash measuring torque level to the output shaft in a first direction while the brake assembly is engaged, measure a first angular position of the output shaft with the position feedback device while the backlash measuring torque level is being applied, energize the electric motor to apply a backlash measuring torque level to the output shaft in a second direction while the brake assembly is engaged, and measure a second angular position of the output shaft with the position feedback device while the backlash measuring torque level is being applied. The difference between the first angular position and the second angular position corresponds to an amount of backlash between the brake rotor and a brake hub of the brake assembly.

The onboard controller is further configured to center the brake rotor prior to energizing the electric motor. Centering the brake rotor can include energizing the motor to apply a centering torque level to the output shaft in a first rotational direction and energizing the motor to apply a centering torque level to the output shaft in a second rotation direction. The centering torque level can be greater than the backlash measuring torque level.

DETAILED DESCRIPTION

Figure 1:
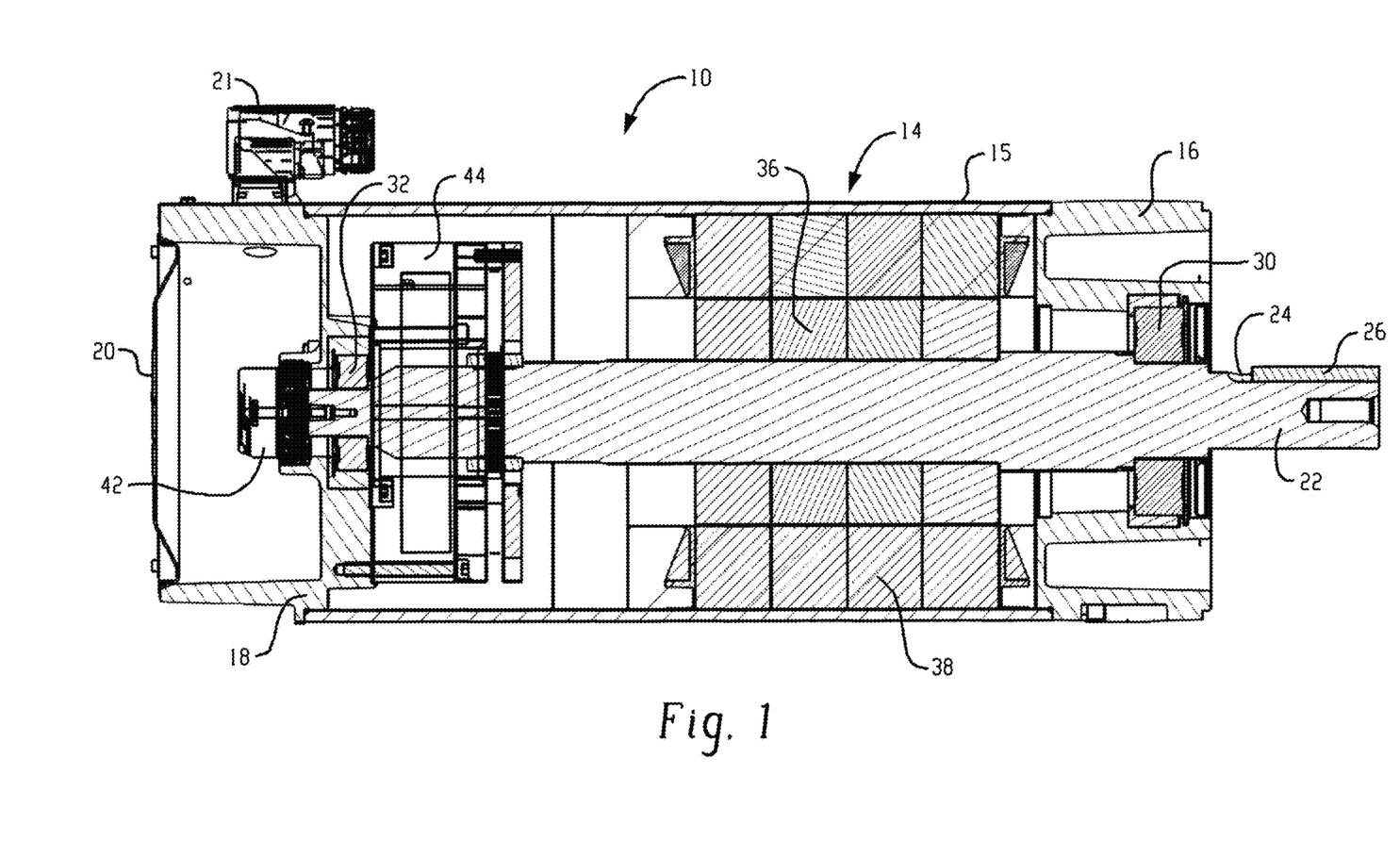
FIG. 1 is a cross-section of an exemplary electric motor in accordance with the present disclosure.

With reference to FIG. 1, an exemplary motor assembly is illustrated and identified generally by reference numeral 10. It will be appreciated that aspects of the present disclosure are applicable to a wide variety of electric motor configurations, as well as other applications where a rotating shaft is present (e.g., pumps, etc.). Accordingly, it should be understood that many of the features of the motor are exemplary in nature and intended to give context to certain aspects of the disclosure.

The exemplary motor assembly 10 generally includes a housing 14 for supporting and/or enclosing the various internal components of the motor 10, as will be described below. The housing 14 includes a main tubular portion 15, a front bearing support/front plate 16 and rear bearing support 17, and an end cap 20. Together, these housing components form a sealed internal chamber (or multiple chambers) for housing, among other things, the rotating elements of the motor, related circuitry and a position feedback device. An electrical connector 21 provides a connection point for coupling the motor 10 to a motor drive (not shown).

An output shaft 22 extends from the housing 14 for connection to an associated component to be driven by the motor assembly 10. The output shaft 22 in the illustrated embodiment includes a keyway 24 for receiving a key 26 for rotationally coupling the output shaft 22 to the associated component. Other coupling arrangements and/or devices are possible.

The output shaft 22 is supported for rotation by front and rear bearings 30 and 32 which are supported, respectively, by the front bearing support/front plate 16 and the rear bearing support 17. As is typical, a rotor 36 is fixed to the output shaft 22 for rotation therewith, while a stator 38 is fixed relative to the tubular main portion 15 of the housing 14. A position feedback device, which in the illustrated embodiment is an encoder 42, is mounted to the rear bearing support 17. The encoder 42 is engaged with the output shaft 22 and provides feedback indicative of, among other things, the angular position of the output shaft 22. The illustrated exemplary motor 10 further includes a brake assembly 44 for braking rotation of the output shaft 22.

Figure 2:
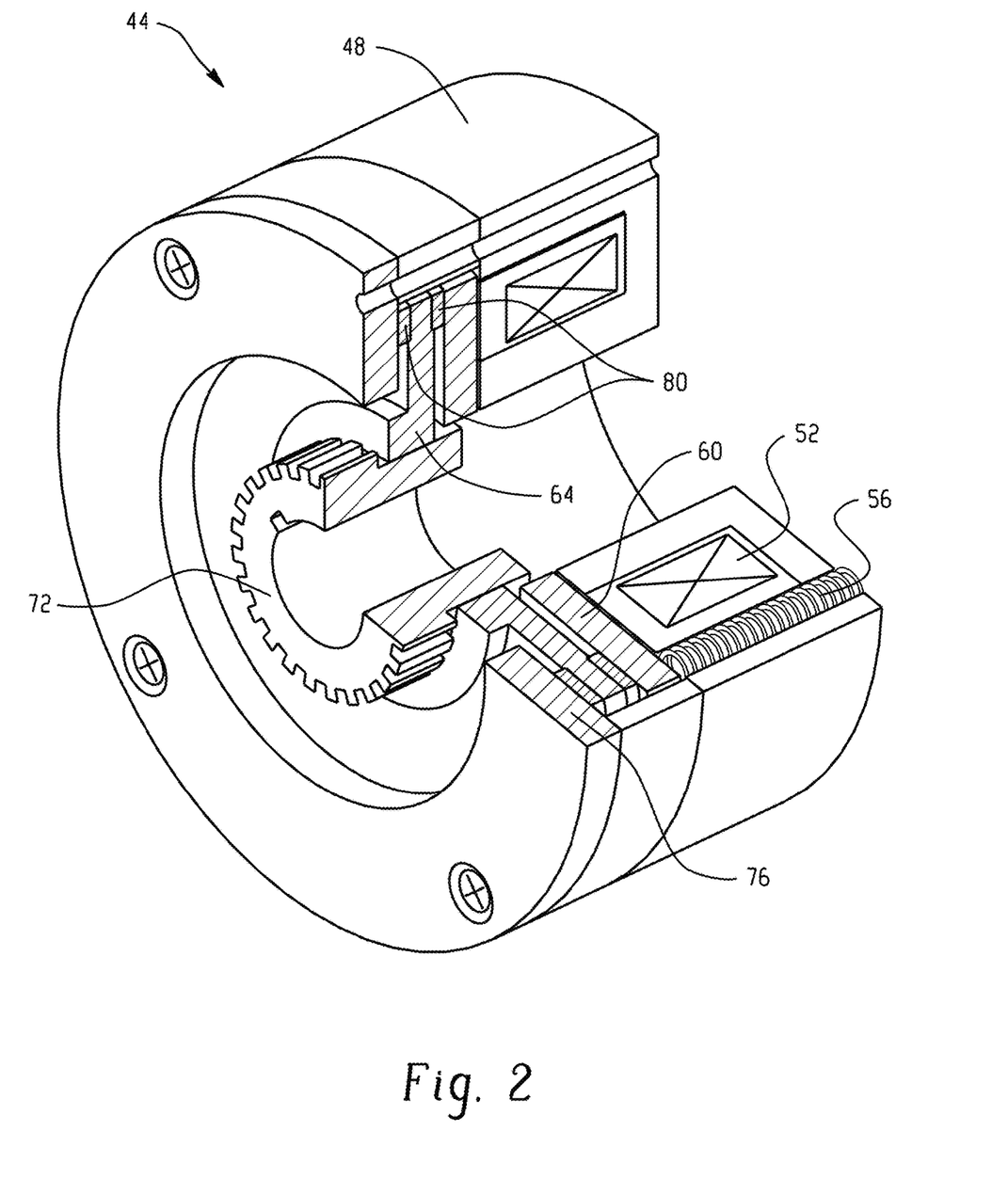
FIG. 2 is a partial cutaway perspective view of an exemplary brake assembly in accordance with the present disclosure.

With additional reference to FIG. 2, the brake assembly 44 is shown in partial cutaway view isolated from the motor assembly 10. The brake assembly 44 generally includes a brake housing 48 in which a coil 52 and a plurality of springs 56 are supported. An armature 60 associated with the coil 52 is configured to compress the springs 56 when energized. When the coil 52 is not energized, the springs 56 force the armature 60 against a brake rotor 64. The brake rotor 64 is splined to a brake hub 72, which in turn is fixed for rotation with the output shaft 22 of the motor assembly 10. Pressure from the springs 56 causes the armature 60 to clamp the brake rotor 64 against an end plate 76 thus braking the output shaft 22. Friction material 80 on the brake rotor 64 enhances the brake's holding ability. The brake assembly 44 is often referred to as a spring-set, fail-safe brake.

It should be appreciated that the brake rotor 64 is designed to float on the brake hub 72 to allow for relatively axial movement therebetween during application and release of braking force. As such, a small tolerance in dimensions is maintained between the splines of the brake rotor 64 and the splines of the brake hub 72 to prevent binding. If the tolerance is too tight, the brake rotor 64 will bind on the brake hub 72 and fail to fully release from the end plate resulting in brake drag and/or premature brake failure.

A new or unworn brake assembly typically has a minimal amount of backlash between the brake rotor 64 and brake hub 72. Backlash is a well-known concept in the field of mechanical engineering, but for the purposes of this disclosure backlash can broadly be understood to correspond to the amount of rotational play between the brake rotor 64 and the brake hub 72. As noted, some backlash may be present in a new or unworn brake, but excessive backlash can be problematic. Backlash tends to increase over time through wearing of the surfaces of the splines on one or both of the brake rotor 64 and brake hub 72.

Figure 3:
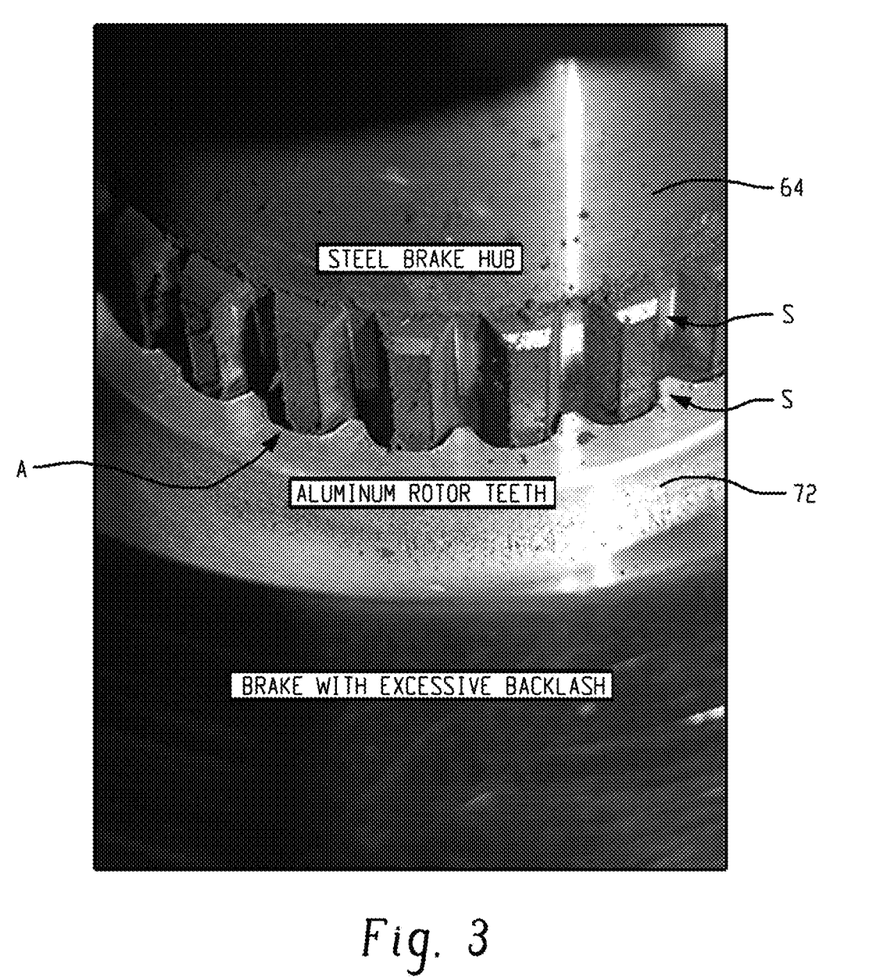
FIG. 3 is a perspective view of a brake hub/rotor interface illustrating wear indicative of excessive backlash.

FIG. 3 illustrates a brake rotor/brake hub assembly with excessive backlash as indicated by arrow A. It should be appreciated that in the illustrated example, the softer metal (aluminum) of the brake hub 64 has worn considerably against the harder metal (steel) of the brake hub 72 resulting in the excessive backlash.

It has been found that many brake assemblies wear relatively uniformly (e.g., in a predictable relatively linear fashion) until a threshold level of backlash is reached. After the threshold level of backlash is reached, brake wear accelerates in a more exponential fashion.

Figure 4:
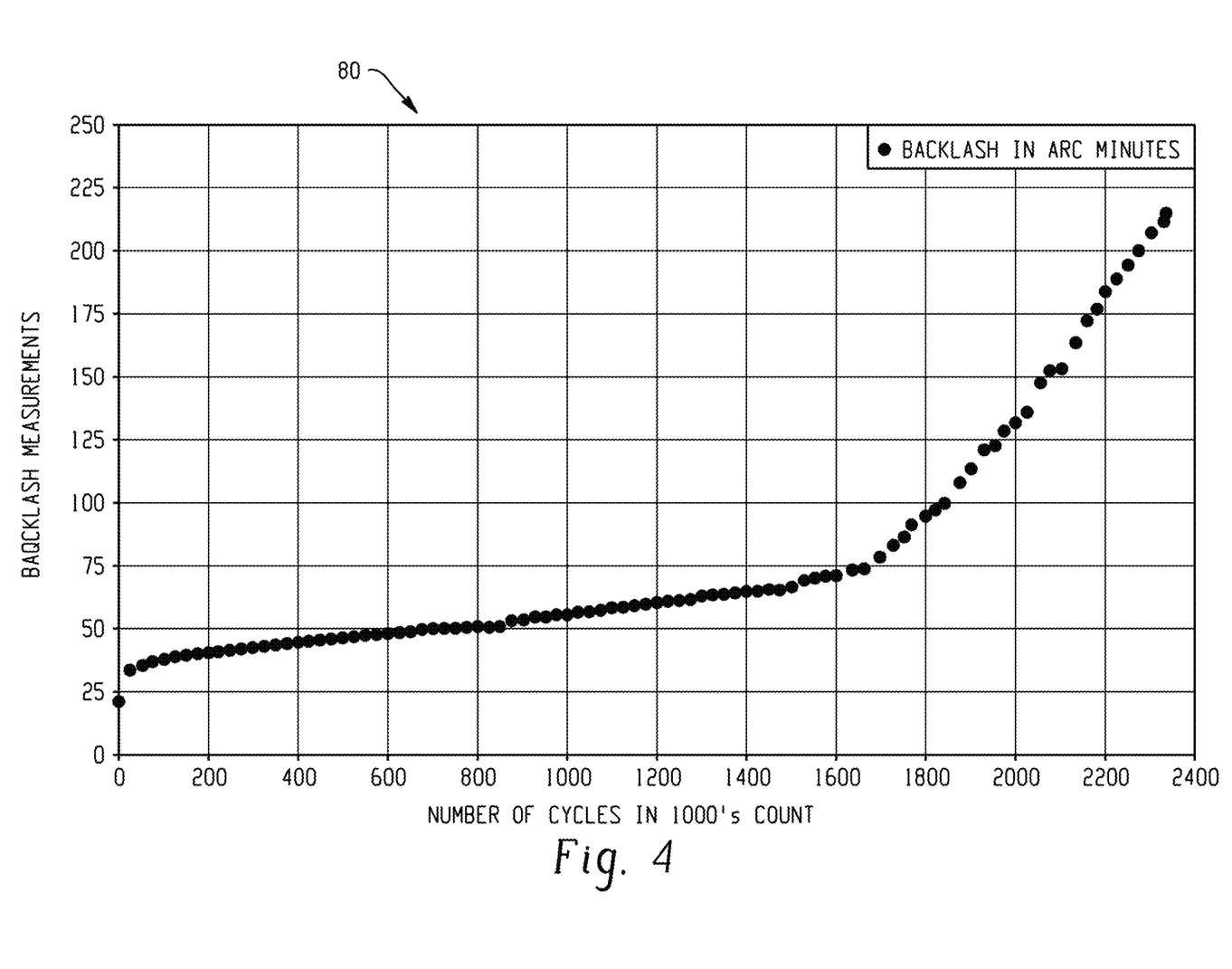
FIG. 4 is a graph of brake cycles vs. backlash for an exemplary brake assembly.

For example, FIG. 4 illustrates a graph 80 of cycles vs. backlash (in arc minutes). As can be seen, until about 1700000 cycles, backlash increases relatively steadily. After about 1700000 cycles, backlash increases at a much higher rate. The increased rate is due at least in part to a change in spline geometry. That is, at a certain point the geometry of the splines is worn substantially enough that further cycling causes rapid additional wear.

Accordingly, aspects of the present disclosure are directed to monitoring the backlash such that corrective action can be taken prior to or within a period of time after reaching the inflection point of brake wear (e.g., 1700000 cycles in the case of the brake assembly of FIG. 4).

Figure 5:
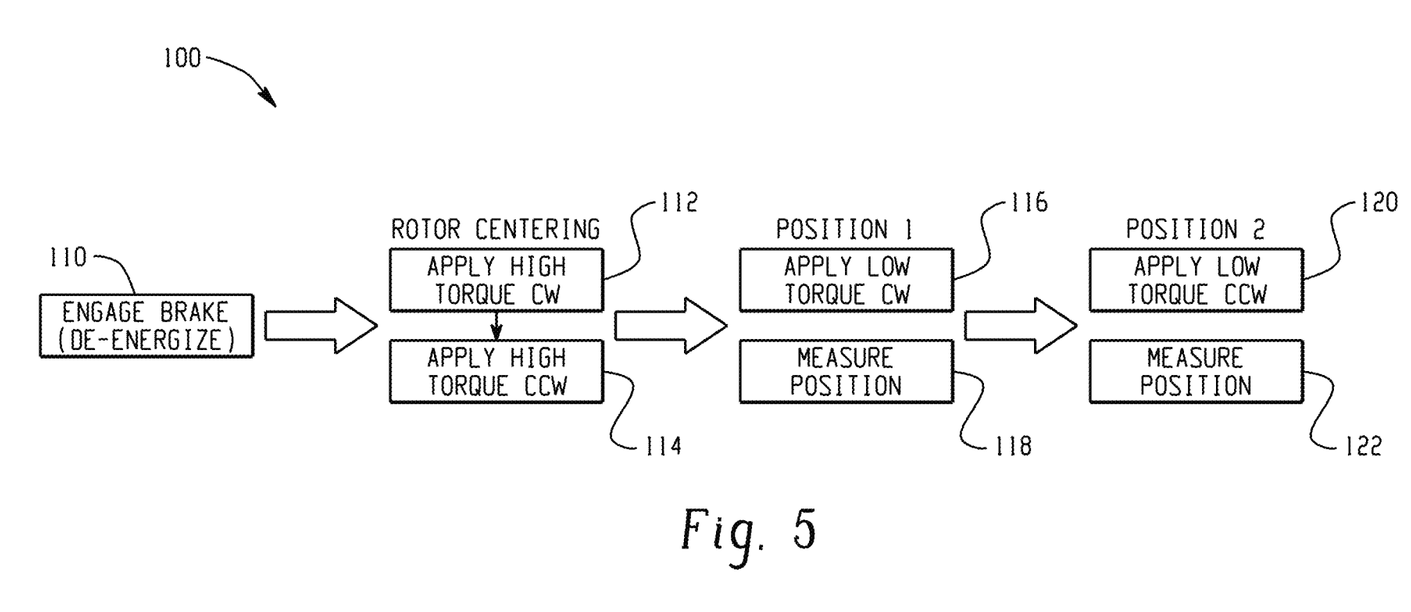
FIG. 5 is a flowchart of an exemplary method of monitoring brake backlash in accordance with the present disclosure.

With reference to FIG. 5, a flowchart is shown illustrating a method 100 for measuring motor brake health. The method generally includes applying the brake assembly to hold the brake rotor in place (e.g., deenergizing the coil to restrict rotation of the brake rotor), centering the brake rotor (e.g., applying high torque to the drive shaft in both clockwise and counterclockwise directions), and applying a low torque to the drive shaft in the clockwise and counterclockwise and obtaining rotational position data from the encoder to determine the amount of play between the brake rotor and the brake hub. The method 100 will be described in connection with the motor assembly 10 shown in FIGS. 1 and 2, but it should be appreciated that the method can be implemented on a wide variety of motor assemblies when such motor assemblies are properly configured to allow torqueing of the motor with the brake engaged.

The method 100 begins in process step 110 wherein the brake assembly 44 of the motor assembly 10 is engaged. As noted above, this is typically performed by de-energizing the coil 52 of the brake assembly 44. In some motor circuitry or drive logic, the brake assembly is configured to be energized (brake disengaged) anytime the motor assembly is generating torque at the output shaft. However, the motor assembly 10 in accordance with the present disclosure is capable of de-energizing the brake assembly 44 (brake engaged) at the same time the motor assembly is generating torque at the output shaft, for example, when operated in a brake diagnostic mode.

Once the brake assembly is engaged, in process steps 112 and 114, the motor assembly generates a relatively high torque (e.g., a centering torque) on the output shaft 22 in both the clockwise and counterclockwise rotational directions to center the brake rotor 64 and/or otherwise ensure the brake rotor 64 is freely floating on the brake hub 72. This step essentially shakes or jars the brake assembly to ensure that the rotor is free from interference due to, for example, brake dust particles or other foreign materials. If the brake rotor 64 is not centered and/or freely floating on the brake hub 72, the remaining steps may not produce a reliable measurement of brake backlash.

In process step 116, a relatively low torque (e.g., a backlash measuring torque) is applied by the motor in a clockwise direction. As will be appreciated, the output shaft 22 and brake hub 72 may rotate relative to the brake rotor 64 until such time as any clearance between a first side of the splines of the brake hub 72 and a first side of the splines of the brake rotor 64 engage. As the brake is engaged, further rotation of the output shaft 22 and brake hub 72 is prevented. An angular position of the output shaft is then recorded using the encoder 42 in process step 118.

In process step 120, a relatively low torque is applied by the motor in a counter-clockwise direction. As will be appreciated, the output shaft 22 and brake 72 may rotate relative to the brake rotor 64 until such time as any clearance between a second side of the splines of the brake hub 72 and a second side of the splines of the brake rotor 64 engage. As the brake is engaged, further rotation of the output shaft 22 and brake hub 72 is prevented. An angular position of the output shaft 22 is then recorded in process step 122. The difference between the angular positions recorded in process steps 118 and 122 is the brake backlash.

In one example, the low torque (e.g., backlash measuring torque) applied by the motor is less than 50% of the continuous rated motor torque value, while the high torque (e.g., centering torque) applied by the motor is more than 50% of the continuous rated motor torque value, and possibly between 80-100% of the continuous rated motor torque value.

Figure 6:
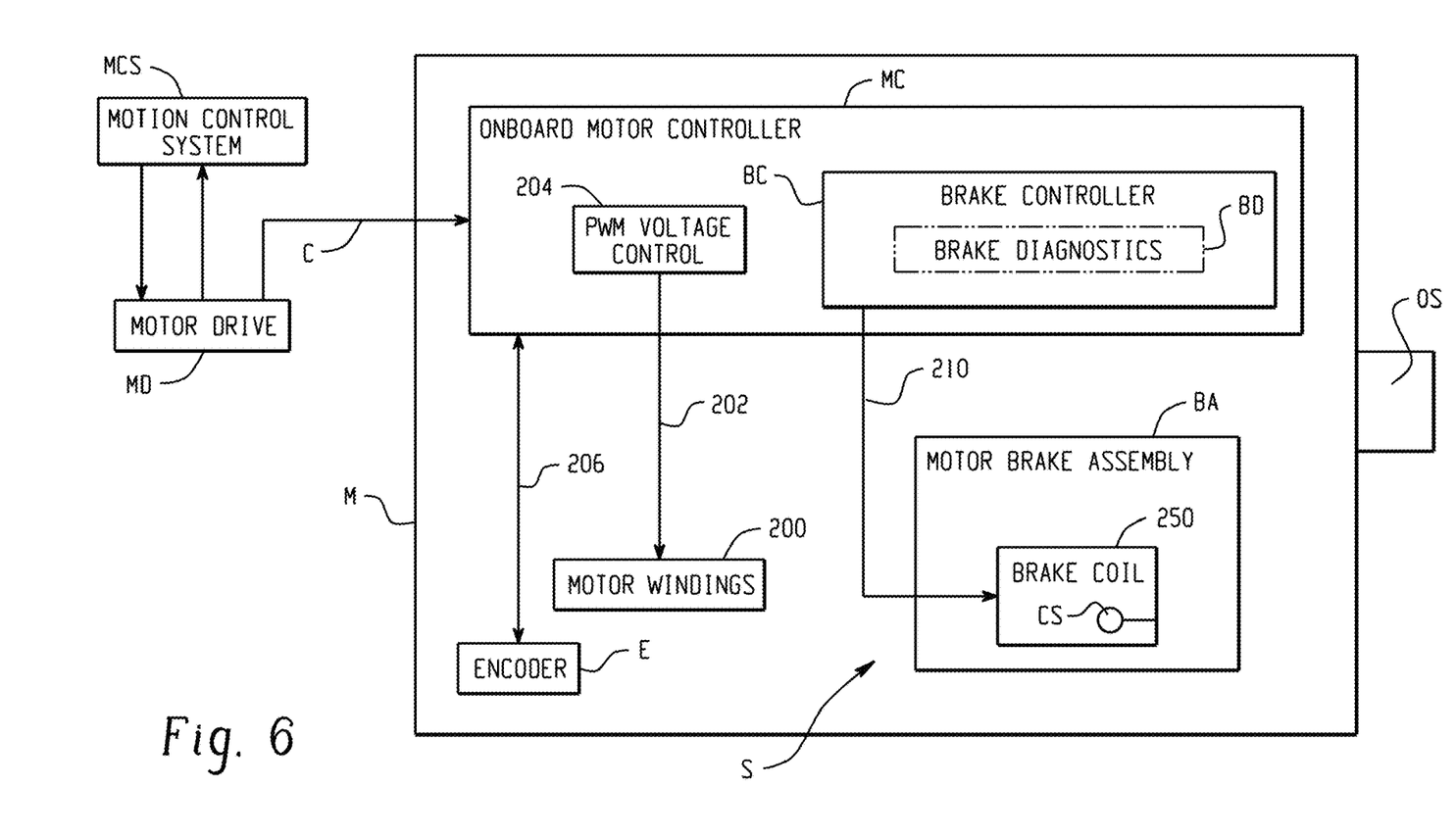
FIG. 6 is a schematic diagram of an exemplary motor assembly including a brake assembly and onboard motor controller in accordance with the present disclosure.

FIG. 6 is a block diagram showing a servo motor brake health monitoring and diagnostic system S according to an embodiment of the present disclosure. The motor M is operably connected to an electronic motion control system MCS such as an industrial automation control system or other electronic control system or processor. The motion control system MCS is operably connected to a motor drive MD which comprises electronic circuitry for controlling the motor M and brake assembly BA thereof in response to control inputs received from the motion control system MCS. The motor M includes an onboard motor controller MC that is part of the motor M, itself, and that is operably connected to the motor drive MD via connector C. The motor controller MC comprises one or more processing units, ASICS, and/or other electronic circuits for controlling the motor M in response to input commands received from the motor drive MD including input commands that specify a desired angular position for the output shaft OS and a speed at which the output shaft OS is to rotate. Typically, the motor controller MC selectively energizes the motor windings 200 of a stator to drive a rotor (not shown) in clockwise or counterclockwise directions using pulse width modulation (PWM) voltage signals 202 output by a PWM voltage control module 204 of the onboard motor controller MC. The onboard motor controller MC receives feedback or error signals 206 from the encoder E indicating the actual angular position of the rotor and output shaft OS, and the onboard motor controller MC continuously alters the PWN voltage signals 202 in response to the feedback received from the encoder E to reduce the error to zero at which time the output shaft OS is located in the specified angular position input by the motor drive MD.

The onboard motor controller MC further comprises a brake controller BC as a part thereof. The brake controller BC comprises one or more electronic circuits for receiving input from the motor drive MD and motor controller MC as to the desired state of the brake assembly BA (i.e., brake engaged/"on" or brake disengaged/"off"), and the brake controller BC either energizes or de-energizes the brake electromagnetic coil 250 to control the brake assembly BA accordingly as generally described, using a coil control voltage signal 210 such as a pulse width modulation (PWM) voltage signal.

The brake controller BC includes a brake diagnostics module BD that is configured to, among other things, measure the brake backlash in accordance with the method described in connection with FIG. 5. As will be appreciated, the brake diagnostics module BD is capable of simultaneously 1) de-energizing the brake coil 250 to engage the brake assembly BA and 2) energizing the motor winding 200 to apply torque to the output shaft of the motor at various levels and in both the clockwise and counterclockwise rotational directions.

As noted, aspects of the present disclosure are apply to a wide range of motor assemblies and, therefore, the configuration shown in FIG. 6 illustrates but one of many possible motor assemblies that can utilize aspects of the present disclosure.

Figure 7:
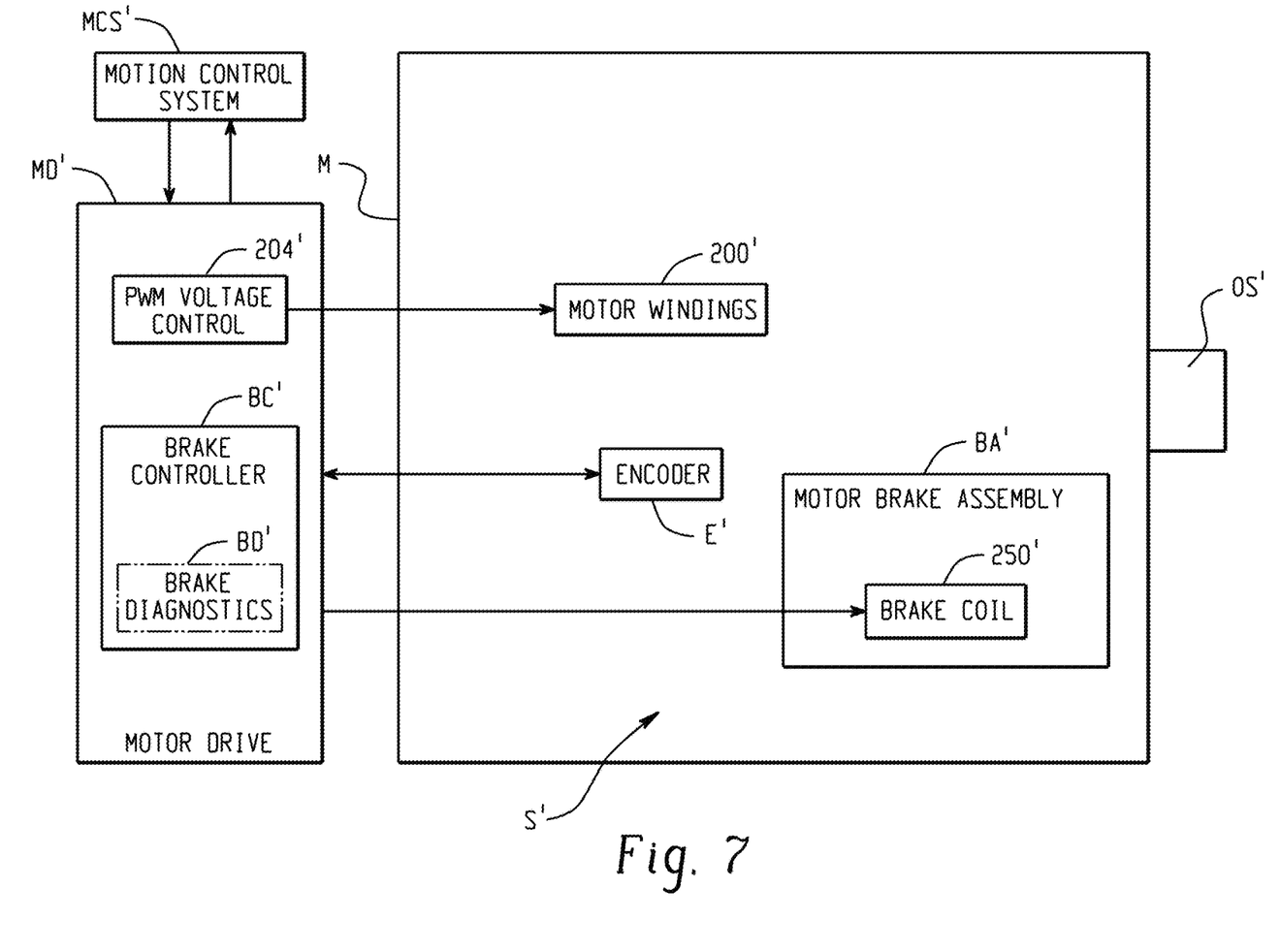
FIG. 7 is a schematic diagram of another exemplary motor assembly including a brake assembly and onboard motor controller in accordance with the present disclosure.

FIG. 7 illustrates another exemplary servo motor brake health monitoring and diagnostic system S' similar in many respects to system S of FIG. 6 with like components denoted with a single prime (e.g., MCS', M', MD', BC', BD', E', BA', 200', 204', 250'). The system S' is virtually identical to the system S except that the motor M' does not include the onboard motor controller MC. Instead, the motor drive MD' performs all motor control operations and includes the PWM voltage controller 204' and the brake controller BC' with brake diagnostics BD', while the encoder E' provides feedback to the motor drive MD' for carrying out, among other things, the brake diagnostics routines set forth above.

It should now be appreciated that the present disclosure sets forth a method and apparatus for measuring brake backlash using the motor assembly's own position feedback device 42. This enables frequent tracking of brake wear such that the brake can be serviced prior to failure. The information obtained from frequent tracking of brake wear can be used to anticipate brake failure, or to generate an alert that service is required.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

The following is claimed:

1. A method for measuring motor brake health of a motor assembly having a brake assembly for braking an output shaft of the motor and a position feedback device for measuring an angular position of the output shaft, the method comprising:
   engaging the brake assembly to restrict rotation of a brake rotor of the brake assembly;
   energizing the motor assembly to apply a backlash measuring torque level to the output shaft of the motor assembly in a first direction while the brake assembly is engaged;
   measuring a first angular position of the output shaft with the position feedback device while the backlash measuring torque level is being applied;
   energizing the motor assembly to apply a backlash measuring torque level to the output shaft in a second direction while the brake assembly is engaged; and
   measuring a second angular position of the output shaft with the position feedback device while the backlash measuring torque level is being applied;
   wherein the difference between the first angular position and the second angular position corresponds to an amount of backlash between the brake rotor and a brake hub of the brake assembly to which the brake rotor is fixed for rotation;
   further comprising centering the brake rotor prior to energizing the motor assembly to apply a backlash measuring torque level, wherein centering the brake rotor includes energizing the motor assembly to apply a centering torque level to the output shaft in a first rotational direction and energizing the motor assembly to apply a centering torque level to the output shaft in a second rotation direction.

2. The method of claim 1, wherein engaging the brake is performed by an onboard motor controller of the motor assembly.

3. The method of claim 2, wherein the energizing the motor assembly to apply a backlash measuring torque level to the output shaft in the first or second direction is performed by an onboard motor controller while the brake is engaged.

4. The method of claim 1, wherein the centering torque level is greater than the backlash measuring torque level.

5. The method of claim 1, wherein the backlash measuring torque level is less than 50 percent of a continuous rated motor torque value.

6. The method of claim 1, wherein the steps are performed with the rotor fixed against rotation by the brake assembly.

7. A motor system comprising an electric motor assembly having a position feedback device and a brake assembly, wherein the electric motor includes a stator, a rotor and an output shaft configured to be driven by the rotor, wherein the brake assembly is operatively coupled to the output shaft for braking rotation of the output shaft, the brake assembly including a brake hub fixed to the output shaft for rotation therewith and a brake rotor rotationally coupled to the brake hub, wherein the position feedback device is configured to measure an angular position of the output shaft, and a motor controller operatively connected to the electric motor and brake assembly, the motor controller including a brake diagnostic module configured to:
   engage the brake assembly to restrict rotation of the brake rotor;
   energize the electric motor to apply a backlash measuring torque level to the output shaft of the motor assembly in a first direction while the brake assembly is engaged;
   measure a first angular position of the output shaft with the position feedback device while the backlash measuring torque level is being applied;
   energize the motor assembly to apply a backlash measuring torque level to the output shaft in a second direction while the brake assembly is engaged; and
   measure a second angular position of the output shaft with the position feedback device while the backlash measuring torque level is being applied;
   wherein the difference between the first angular position and the second angular position corresponds to an amount of backlash between the brake rotor and a brake hub of the brake assembly to which the brake rotor is fixed for rotation; and
   and wherein the brake diagnostic module is further configured to center the brake rotor prior to energizing the motor assembly to apply a backlash measuring torque level, wherein centering the brake rotor includes energizing the motor assembly to apply a centering torque level to the output shaft in a first rotational direction and energizing the motor assembly to apply a centering torque level to the output shaft in a second rotation direction.

8. The motor assembly of claim 7, wherein the electric motor is a servo motor.

9. The motor assembly of claim 7, wherein the brake assembly includes a coil and at least one spring for biasing an armature of the coil toward a brake engaged position, the coil being configured to disengage the brake when energized by the onboard controller.

10. The motor assembly of claim 9, wherein the brake rotor and brake hub have mating splines, the brake rotor being movable axially relative to the brake rotor hub during brake engagement and disengagement.

11. The motor assembly of claim 10, wherein the splines are trapezoidal in cross-section.

12. The motor assembly of claim 7, wherein the centering torque level is greater than the backlash measuring torque level.

13. A motor controller for a motor assembly having an electric motor with an output shaft, a brake assembly for braking rotation of the output shaft, and a position feedback device, the motor controller comprising a brake diagnostic module configured to:

engage the brake assembly to restrict rotation of a brake rotor of the brake assembly;

energize the electric motor to apply a backlash measuring torque level to the output shaft in a first direction while the brake assembly is engaged;

measure a first angular position of the output shaft with the position feedback device while the backlash measuring torque level is being applied;

energize the electric motor to apply a backlash measuring torque level to the output shaft in a second direction while the brake assembly is engaged; and measure a second angular position of the output shaft with the position feedback device while the backlash measuring torque level is being applied;

wherein the difference between the first angular position and the second angular position corresponds to an amount of backlash between the brake rotor and a brake hub of the brake assembly to which the brake rotor is fixed for rotation; and wherein the brake diagnostic module is further configured to center the brake rotor prior to energizing the motor assembly to apply a backlash measuring torque level, wherein centering the brake rotor includes energizing the motor assembly to apply a centering torque level to the output shaft in a first rotational direction and energizing the motor assembly to apply a centering torque level to the output shaft in a second rotation direction.

14. The motor controller of claim 13, wherein the centering torque level is greater than the backlash measuring torque level.

* * * * *